US012525325B2

(12) United States Patent
Beeler et al.

(10) Patent No.: US 12,525,325 B2
(45) Date of Patent: Jan. 13, 2026

(54) SYSTEMS AND METHODS FOR DATA REFERENCE LINKS TO MAINTAIN DATA VALIDATION

(71) Applicant: ICON CLINICAL RESEARCH LIMITED, Leopardstown (IE)

(72) Inventors: Jeff Beeler, Cary, NC (US); Matt Sabol, Springfield, VA (US); John Bigley, Lincoln, CA (US)

(73) Assignee: ICON CLINICAL RESEARCH LIMITED

( * ) Notice: Subject to any disclaimer, the term of this patent is extended or adjusted under 35 U.S.C. 154(b) by 81 days.

(21) Appl. No.: 18/489,721

(22) Filed: Oct. 18, 2023

(65) Prior Publication Data

US 2025/0131990 A1    Apr. 24, 2025

(51) Int. Cl.
*G16H 10/20* (2018.01)

(52) U.S. Cl.
CPC .................................. *G16H 10/20* (2018.01)

(58) Field of Classification Search
CPC ........ G16H 10/20; G16H 10/60; G16H 15/00; G16H 40/00; G16H 40/20; G16H 70/00; G16H 70/20
See application file for complete search history.

(56) References Cited

U.S. PATENT DOCUMENTS

| 7,251,609 | B1 * | 7/2007 | McAlindon ............ | G16H 10/20 707/999.009 |
| 10,706,958 | B2 | 7/2020 | Ikeguchi et al. | |
| 11,082,487 | B1 * | 8/2021 | Jain ....................... | H04L 67/535 |
| 11,727,740 | B1 * | 8/2023 | Bodurka ............ | G07C 9/00571 340/5.7 |
| 12,217,835 | B2 * | 2/2025 | Adhikari ............. | G06F 11/3688 |
| 2011/0093281 | A1 | 4/2011 | Plummer et al. | |
| 2013/0346101 | A1 | 12/2013 | Kahn et al. | |

(Continued)

FOREIGN PATENT DOCUMENTS

WO    WO-2018034913 A1 *    2/2018    ............. G06Q 30/02

OTHER PUBLICATIONS

Lu, Electronic Data-Capturing Technology for Clinical Trials, 2010, IEEE Engineering in Medicine and Biology Magazine, vol. 29, Iss. 2, pp. 95-102. (Year: 2010).*

(Continued)

*Primary Examiner* — Christopher L Gilligan
(74) *Attorney, Agent, or Firm* — Bookoff McAndrews, PLLC

(57) ABSTRACT

Systems and methods for using data reference links to maintain data validation are disclosed. The method may include: initiating, via a trial server, a trial session for a user; determining, via the trial server, a validated instrument to be accessed for the trial session; transmitting, to an instrument library and via the trial session, a request for an instance of the validated instrument; receiving, from the instrument library, a data reference object that is operable as a data reference link to the validated instrument stored in the instrument library, such that the data reference object is operable to execute the validated instrument without generating a copy of the validated instrument; and causing a Graphical User Interface (GUI) of the trial session to operate the data reference object, such that a user device executes the validated instrument by reference.

20 Claims, 7 Drawing Sheets

(56) References Cited

U.S. PATENT DOCUMENTS

| | | | |
|---|---|---|---|
| 2016/0283676 A1* | 9/2016 | Lyon | G06Q 40/08 |
| 2021/0295956 A1 | 9/2021 | Adhikari et al. | |
| 2022/0245270 A1 | 8/2022 | De Araujo et al. | |
| 2023/0047438 A1* | 2/2023 | Gudesblatt | G16H 80/00 |
| 2023/0069987 A1* | 3/2023 | Alden | G16H 15/00 |
| 2023/0385532 A1* | 11/2023 | McVeigh | G06F 40/186 |
| 2023/0419223 A1* | 12/2023 | Mueller | G06Q 10/0635 |

OTHER PUBLICATIONS

Sayeed Raheel et al: "Smart Markers: 1-15 collecting patient-generated health data as a standardized property of health information technology", NPJ Digital Medicine, vol. 3, No. 1, Jan. 23, 2020 (Jan. 23, 2020), XP093221135, ISSN: 2398-6352, DOI: 10.1038/s41746-020-0218-6 Retrieved from the Internet: URL:https://www.nature.com/articles/s41746-020-0218-6> G16H* figures 1-5.
Extended European search report in corresponding European Application No. 24204049.1-1122, dated Mar. 4, 2025 (9 pages).

* cited by examiner

SYSTEMS AND METHODS FOR DATA REFERENCE LINKS TO MAINTAIN DATA VALIDATION

TECHNICAL FIELD

Various embodiments of the present disclosure relate generally to validated questionnaires for clinical research. More specifically, particular techniques of the present disclosure relate to systems and methods for data reference links to maintain data validation.

BACKGROUND

Generally, clinical research involves standardization of clinical endpoints. Clinical endpoints may refer to the outcome of clinical trial that is statistically analyzed to help determine the efficacy of the study performed within the clinical research. Standardization of the clinical endpoint may assist in quantifying specific measures set further to support changes in reported data. An exemplary clinical endpoint may be questionnaires that have been validated clinically to support a regulatory submission. Building a validated questionnaire may be complex and time consuming.

Conventional techniques generally require validating a particular questionnaire for each study the questionnaire is utilized in. Further, a new validation may be needed for each particular language of a questionnaire. Validating a particular questionnaire for a particular study may takes months to perform, leading to additional time required to perform a study.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, methods and systems are disclosed for monitoring data provenance and determining data integrity. Each of the aspects of the disclosure herein may include one or more of the features described in connection with any of the other disclosed aspects.

According to one example of the present disclosure a method for using data reference links to maintain data validation may be described. The method may include initiating, via a trial server, a trial session for a user; determining, via the trial server, a validated instrument to be accessed for the trial session; transmitting, to an instrument library and via the trial session, a request for an instance of the validated instrument; receiving, from the instrument library, a data reference object that is operable as a data reference link to the validated instrument stored in the instrument library, such that the data reference object is operable to execute the validated instrument without generating a copy of the validated instrument; and causing a Graphical User Interface (GUI) of the trial session to operate the data reference object, such that a user device executes the validated instrument by reference.

According to one example of the present disclosure, a system for using data reference links to maintain data validation may be described. The system may include at least one memory storing instructions; and at least one processor configured to execute the instructions to perform operations for determining data integrity, the operations including: initiating, via a trial server, a trial session for a user; determining, via the trial server, a validated instrument to be accessed for the trial session; transmitting, to an instrument library and via the trial session, a request for an instance of the validated instrument; receiving, from the instrument library, a data reference object that is operable as a data reference link to the validated instrument stored in the instrument library, such that the data reference object is operable to execute the validated instrument without generating a copy of the validated instrument; and causing a Graphical User Interface (GUI) of the trial session to operate the data reference object, such that a user device executes the validated instrument by reference.

According to one example of the present disclosure, a non-transitory computer readable medium system for using data reference links to maintain data validation may be described. The computer readable medium storing processor-readable instructions which, when executed by at least one processor, cause the at least one processor to perform operations including: initiating, via a trial server, a trial session for a user; determining, via the trial server, a validated instrument to be accessed for the trial session; transmitting, to an instrument library and via the trial session, a request for an instance of the validated instrument; receiving, from the instrument library, a data reference object that is operable as a data reference link to the validated instrument stored in the instrument library, such that the data reference object is operable to execute the validated instrument without generating a copy of the validated instrument; and causing a Graphical User Interface (GUI) of the trial session to operate the data reference object, such that a user device executes the validated instrument by reference.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
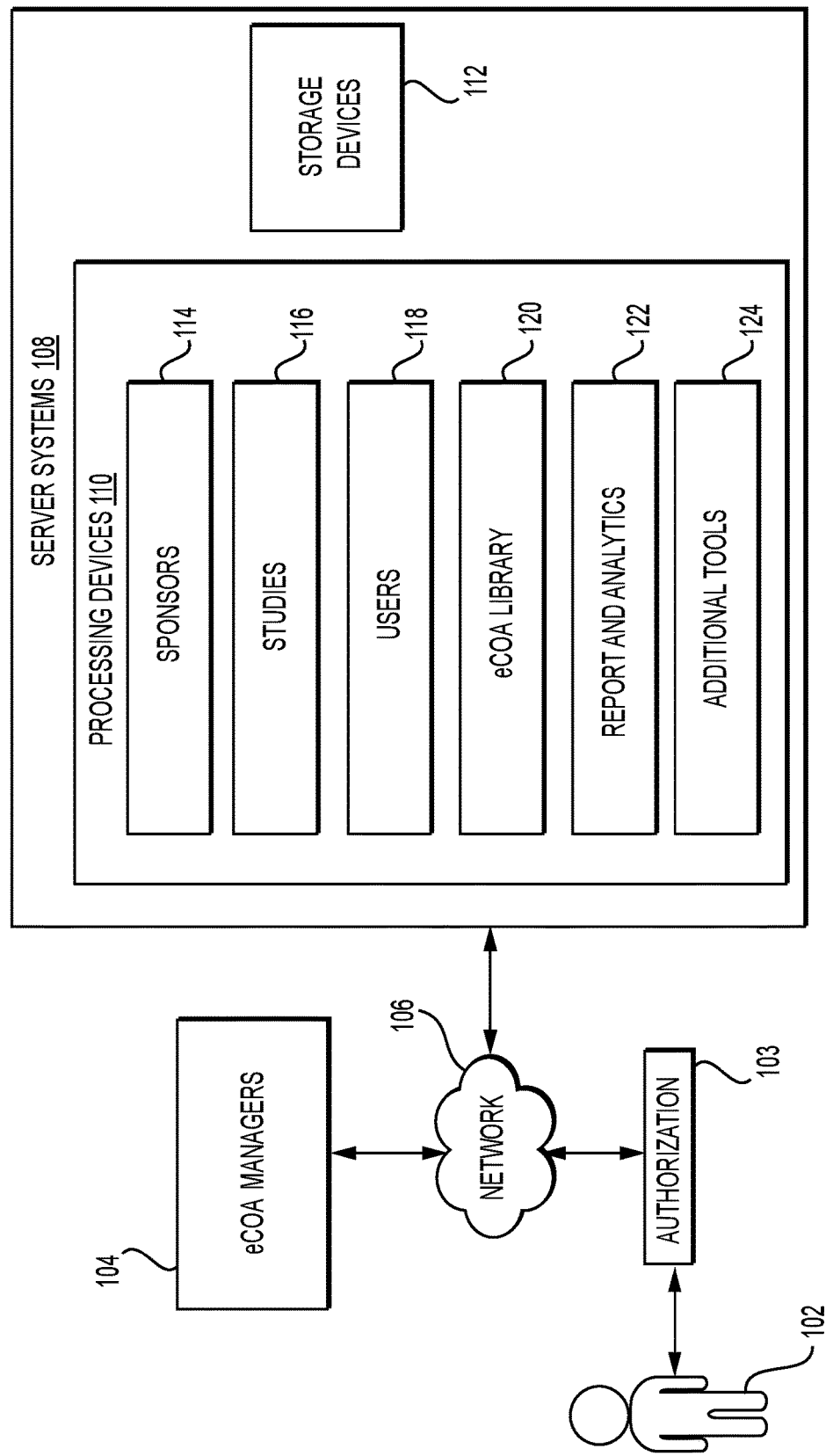
FIG. 1 depicts an exemplary environment for creating, validating, and administering an instrument, according to one or more embodiments.

According to certain aspects of the disclosure, methods and systems are disclosed for monitoring data provenance, determining data integrity, and/or other tasks that may be related to remotely managing a clinical trial or similar operation. These methods and system may be usable to determine the accuracy and/or reliability of data collected during, for example, clinical trials. As will be discussed in more detail below, in various embodiments, systems and methods are described that incorporate features such as protocol deviation determination, measurement validity determination, patient identification, difficulty determination, overall risk determination, and/or data normalization.

Reference to any particular activity is provided in this disclosure only for convenience and not intended to limit the disclosure. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms like "provider," "medical provider," or the like generally encompass an entity, person, or organization that may seek information, resolution of an issue, or engage in any other type of interaction with a patient, e.g., to provide medical care, medical intervention or advice, or the like. Terms like "patient," "client," "participant," "study participant" or the like generally encompass any person or entity who is obtaining information, seeking resolution of an issue, or engaging in any other type of interaction with a medical provider, e.g., to receive such care, information, or the like. Terms like "user" generally encompass any person or entity that may obtain information, resolution of an issue, purchase of a product, or engage in any other type of interaction with a provider or patient, whereby the user may be the medical provider or the patient as the case may be. For example, an individual that collects data on themselves may be both a patient and a user. A user may also refer to a patient that is being assisted by a provider. Further, a user may refer to a provider entering data on behalf of a patient.

In some instances, implementing a clinical trial to conduct clinical research may include having standardization of clinical endpoints. The clinical endpoints may be outcome measures of clinical research trials. Clinical endpoints may include instruments. An instrument may refer to an assessment that has been developed that has been shown to provide clinical meaningful outcomes based upon a certain change from the baseline of a participant. An instrument may contain specific structure and may be configured to be displayed in a manner specific to an author's intent and/or clinical trial guidelines or regulations.

An exemplary instrument may be a questionnaire such as an electronic clinical outcome assessment ("eCOA"). An eCOA may need to be validated clinically to support regulatory submissions. Clinical validation may be a process of verifying an instrument's procedures (e.g., the set of questions) to verify that the measurements provide a clinically meaningful outcome. A clinical validation may for example be performed internally by a particular organization. A clinical validation may be constructed to be standardized for a validated instrument (e.g., such as a validated eCOA). A clinical validation may promote the use of a standard set of data from time point to time point and provide reliable results with a known outcome that is based upon a change over time as opposed to a random error.

The process of creating, validating, and using an instrument (e.g., an eCOA) may be time consuming. For example, the process of performing a clinical validation may take multiple months for a single eCOA to be created and validated.

Conventional systems for clinical studies may require validating an instrument for each particular study. An issue may arises that when a new study wishes to utilize a previously created validated instrument, then the instrument may need to be revalidated. Further, if a study is translated, further validations of each translation may need to be performed. This process may be time-consuming and waste resources for new studies.

One or more embodiments of the system described herein may provide a digital platform that has the means to configure a clinically validated instrument, create screen shots for verification from the author, and store a digital version for use without changing the underlying structure of the validated instrument. The digital platform may include digital storage of an instrument, certification of validations of an instrument, translations of a particular instrument, screen shots of a particular instrument, and means to utilize a digital store for an identical representation of a validated instruments for one or more studies.

One or more embodiments of the system may offer the advantage of only requiring a single configuration of an instrument. For example, the system may offer tools to create and store a particular eCOA within the platform. The system may offer the advantage of requiring only a single validation of a created instrument. This instrument may be accessed and utilized in multiple studies while staying validated, as will be described in greater detail below. The system may offer a single certification of an instrument. Certification as used herein generally encompasses a process by which an instrument undergoes a technical validation that it conforms to an author's original electronic or paper version according to the author's wishes. This technical validation process, in embodiments, may be separate from a clinical validation of the instrument (i.e., confirming that endpoints are statistically significant), and instead refers to the verification that the look and interpretation is as the author intended with the original validated instrument.

One or more embodiments of the system may offer tools for a user and/or an organization to prepare an eCOA. The system may further offer tools to create a study, as well as a schedule that utilizes a validated eCOA. A study may refer to a research study involving human subjects that aims to evaluate the effects of a biomedical intervention (e.g., drugs, treatment, devices, etc.) on health-related outcomes. A schedule may refer to a schedule of activities that provides the tasks and milestones, along with the corresponding timeline that are critical to the execution of a study.

One or more embodiments of the system may offer a digital platform that utilizes a method for using data reference links to maintain data validation during use. As will be discussed in greater detail below, a validated instrument may be accessed for a trial session during a study. The system may allow for the transmission of a request for a particular instance of a validated instrument during the trial session. The system may be configured to receive a data reference object that is operable as a data reference link to the validated instrument that is stored in an instrument library, such that the data reference object is operable to execute the validated instrument without generating a copy of the validated instrument. The system may further allow for a Graphical User Interface ("GUI") of the trail session to operate the data reference object, such that the user device executes the validated instrument by reference.

Clinical trials may be run in one or more countries, regions, or locations which may require multiple language and variations of languages to be provided to participants of a clinical trial. Scaling the process and procedures of linguistic translations and respective validations for translations may be difficult, error prone, time consuming, and may produce unexpected results. Strict guidelines may be required to meet both regulator and copywriting requirements to ensure consistent linguistic validations. Further, in conventional implementations, each translation of an instrument may need to be separately validated and certified, which can rapidly expand the complexity, cost, and time to implement a study with participants speaking different languages.

One or more embodiments of the system may improve the scalability, quality, and speed associated with utilize multiple languages and language locales within a clinical trial. The system may utilize keyed values to serve a questionnaire written in English to a participant's native language and associated dialect. The questionnaire may only be drafted once, quality checked in English, and sent off for translation to a locale. At a locale level, a translation may be performed and saved. Next, the instrument (e.g., the questionnaire or form) may be served in the locale to the participant. Upon completion of the instrument, the responses may be converted back to the original language for review and reporting. An advantage is that the study team may only see the questions and answers in the original layer.

Clinical trials may require scheduling tools that are robust and flexible enough to accommodate initial configurations as well as updates throughout a trial. Conventional scheduling tools may include schedules heavily tied to forms that are built to a particular instance of the schedule. Edits to the forms may cause data loss or the changing of data types during a study. Another issue with conventional systems is that forms may need to be manually moved and copied from one version of a schedule to an updated version of the schedule. Further, conventional system may have difficulty with regression testing and may only be capable of administering a single study schedule at a given time. Conventional systems may utilize structured and non-structured database systems that create unique forms for each instance within a deployed schedule for similar data capture. Further, the database may require updates with each additional change to a study.

One or more embodiments of the system may include a scalable and flexible study planner. The planner may align with the schedule of activities (SoA) per the clinical trial protocol. The planner of the system described herein may accommodate one or more SoA per study and multiple form versions utilized per schedule. The planner may be designed to enable loose references to forms within the system (e.g., within the SoA). This may allow for a single form to be utilized by more than one schedule simultaneously. This may allow for the development and verification of a single form that can be shared by multiple SoAs.

FIG. 1 depicts an exemplary environment for creating, validating, and administering an instrument, according to one or more embodiments. Environment 100 depicts an electronic network 106 that may be connected to servers of one or more eCOA Managers 104 or users 102. An eCOA manager 104 may include a server configured to interact with the server systems 108 described below. The eCOA manager 104 may be responsible for creating, certifying, and/or validating instruments for one or more studies. An eCOA manager 104 may further be utilized to create a study as well as a schedule for a study. The eCOA manager 104 may further include a trial server to initiate a trial session of a clinical study for one or more users 102.

Further, a user 102 may access one or more instruments through the network 106. A user 102, may for example be a patient participating within one or more studies. The user 102 may for example access an eCOA for a particular study through a GUI of a user device. The user device may be a computing device such as computer 600 described below. This may allow a user 102 to respond to and answer questions for a particular eCOA. The eCOA forms may be located in an eCOA library 120 of a server systems 108 as will be discussed in more detail below.

A user 102 may require an authorization from an authorization system 103 prior to accessing an eCOA form. For example, a user 102 may first require permission to access eCOA forms. As will be discussed in further detail below, eCOA forms may be stored in a fast healthcare interoperability resource ("FHIR") server. FHIR may refer to the set of rules and specifications required for exchanging electronic healthcare data. To access the FHIR server, the user 102 may utilize an authorization system 103, as the FHIR server may not be accessible directly from the internet. The authorization system 103 may include an identity provider ("IDP") web server that allows access to the FHIR server in which the eCOA forms are stored. The authorization system 103 may further include a firewall and a particular application programming interface ("API") (e.g., an Azure API for FHIR) for accessing the eCOA forms stored in the eCOA library 120.

According to an exemplary embodiment of the present disclosure, the electronic network 106 may also be connected to server systems 108, which may include processing devices 110 that are configured to implement one or more modules or servers (e.g., sponsors module 114, studies module 116, users module 118, eCOA library 120, report and analytics module 122, and additional tools 124) configured to create, certify, validate, administer, and or store one or more instruments for use within a study, according to an exemplary embodiment of the present disclosure.

The sponsors module 114 may be configured to store information related to a sponsor utilizing the server systems 108 to conduct a study. For example, the sponsors module 114 may keep track of organizations that are utilizing the server system 108 to conduct a study. The sponsors module 114 may track each sponsor's studies, plans, and any created instruments by the particular sponsor.

The studies module 116 may include a database tracking all active and past studies performed by the server systems 108. The database within the studies module 116 may include a protocol number, a study name, a corresponding sponsor, a configuration status, and any pending actions for any studies conducted by the server systems 108. A moderator for a study may access the current results of a study through the studies module 116.

A users module 118 may be configured to store information related to patients of a study, study personnel, and system administrator . . . rein. The users module 118 may further include any studies the user is participating in. The users module 118 may further include a user's full name, email address, role within the system, account status, and last login into the system described herein. Further, the users module 118 may be configured to add additional users to one or more studies. For example, an eCOA manager 104 may enter the email address, name, language, time zone, role, assigned study, and assigned site of a new user to the user module 118.

The eCOA library 120 may be configured to store one or more instruments including an eCOA. The eCOA library 120 may store the title, type of instrument, status of the instrument, amount of external version, amount of internal versions, and allow for actions to be conducted regarding an instrument. The eCOA library 120 and/or documents within the eCOA library 120 may be stored in a Fast Healthcare Interoperability Resource (FHIR) server. The eCOA library 120 may further include a "new form" function. The new form function may allow for an individual (e.g., an eCOA managers 104) to create a new eCOA form. For example, the interface may allow a user to create a display type, questions types, and sliders for a particular study. Question types may include the number, quantity, date, time, text, choice, and EuroQol (EQ)-visual analogue scale (VAS).

The reports and analytics module 122 may be configured to store one or more reports and or analytics corresponding to one or more studies from the studies module 116. The reports and analytics library may include one or more data analysis tools to further analyze, graph, and organize responses to the instruments from the eCOA library 120. Further, reports may be generated that include the analysis and graphs performed. The analytics and reports may for example be accessed by the eCOA managers 104.

The additional tools 124 may include one or more processors or servers configured to perform function such as: developing a study, a planner for determining a schedule for a particular study, a study configuration, translations, sites, tokenization, and resources. Study configuration may refer to the phases, visits, recurring questionnaires, and their association with each. Configuration may refer to "how" instruments are assigned in a specific schedule for a participant or clinical site to complete the questionnaire. The execution of the study schedule may refer to "when" each of the events (e.g., questionnaires) will occur. The study configuration may include a calendar of the particular events. Sites may refer to the clinical sites that are defined for each study. Each site may have one or multiple languages assigned to the configuration. The developing a study function may allow for a user to upload planned medical tests and measurements, as well as a particular timelines for all parts of the clinical study. Once a study is created, a user (e.g., an individual administering or creating the study) may assign a timeline for each phase of the study.

One of the additional tools 124 may allow for translations of the study. In conventional studies, questionnaires and forms may be created in each specific local and then served to patients. This may include the following three problems: (1) only the participant's native language can be seen by the physician and the clinical staff; (2) all results are saved in the participant's native language; and (3) when reporting the saved response, a system must convert the native language to a common language. In contrast, the system described herein may perform the following three steps: (1) administer the instrument (e.g., the eCOA) in a language native to the participant and allow the participant to complete the study in their native language; (2) translates (e.g., by a third-party translation service) the response back to a common language prior to the study team reviews the results; and (3) the results of the questions are saved in a common language for reporting, which may assist with regulatory submissions.

One of the additional tools 124 may further include the ability to provide a preview element for an eCOA manager 104 preparing an instrument. This may enable a configurator to render an emulated version of a clinical eCOA without deploying it to a separate environment and loading it into a mobile device. This may expedite the process of developing a an instrument. A problem with conventional clinical questionnaires is that a portion of the process for preparing questionnaires is to render and review screen shots of the instrument. This may be cumbersome as the instrument must be deployed to an environment and rendered on the mobile device multiple times before getting spacing, text, and font completed to the author's specification. The system described herein may offer one or more of the following three advantages as compared to conventional systems: (1) configured screen can be reviewed for accuracy, completeness, and overall design without leaving the configuration tool during construction of an instrument; (2) screen shots can be taken via the tool to reduce the need for one-by-one screen shots rendered on a mobile device; and (3) configuration may become quicker without deployments to a separate environment for verification. Advantage (2) may take effect during the certification process of an instrument, and subsequent submission to an internal review board. In some instances, one or more screen shots of each instrument may be required as evidence of the representation of the instrument on a mobile device. Each screen shot may then be used to confirm the instrument conforms to the standards set by the author and does not coerce or lead the participant in any way based upon the layout, button placement, etc. Overall, this feature may assist with expediting the process of creating an instrument.

One the additional tools 124 may further include a planner for studies. For example, the server system 108 may accommodate one or more SoA's for one or more clinical studies.

When preparing a SoA for a clinical study, there may be specific clinical and participant data points that need to be captured for a given protocol version of a clinical study. Each schedule may be unique and require particular forms to be created to capture the data. Further, changes may be required for a form both prior to and during a study. For example, there may be protocol amendments prior to a first participant being enrolled in a study. The planner of the additional tools 124 may be designed to enable a loose reference to stored forms within the SoA (the SoA being stored in the server systems 108). This may allow for the same form to be utilized by one or more schedules simultaneously. This may enable the development and verification of one form that can be shared by many SoAs. An SoA can be copied to make a new SoA and reference the identical forms that were used by an original SoA, while not creating a clone of the original form. As the form is unchanged, there may be no need for regression tests of the new forms.

The planner of the additional tools 124 may allow for a single form to be constructed. The single form may be named and assigned to a particular schedule of a clinical study. Further, the form may be reviewed and validated within the server systems 108. The single form may be deployed within a particular study in multiple manners by referencing the created form. A system servers 108 may allow a user (e.g., the eCOA manager 104) to schedule from development to quality assurance (QA)/user acceptance testing (UAT) to Live all within the same configuration workflow. For example, the system may be set up to allow a "status" to be utilized that prevents the building, exporting, and rebuilding of a schedule/study on multiple servers. Therefore, the tested study may be the study that goes "live." This may allow for a single round of testing and deployment. Once a schedule is deployed, a user (e.g., a eCOA manager 104) may utilize the planner to clone the schedule, make necessary changes (add/remove forms) all without making changes to the underlying data and database. Effectively, one may test the schedule and changes made to the schedule, not the prior referenced forms, making the system more accurate and highly scalable. Study schedule changes may be implemented without sacrificing prior submitted data integrated, as impacted forms/schedules are transactional and do not require database changes.

The server systems 108 may further include one or more storage devices 112. The storage devices 112 may be responsible for storing uploaded instruments, studies, clinical trial information, user information, reports and analytics, as well as sponsor information. Each of the modules within processing devices 110 may have access to the one or more storage devices 112.

Any of the above devices, tools and modules may be located on a device that may be connected to an electronic network 106, such as the Internet or a cloud service provider, through one or more computers, servers, and/or handheld mobile devices.

Figure 2:
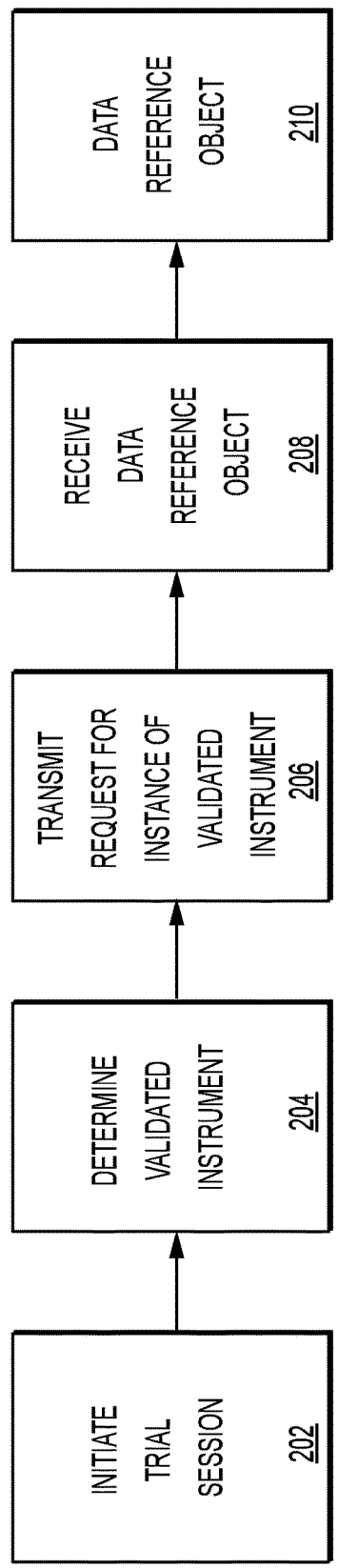
FIG. 2 depicts an exemplary flow diagram illustrating a workflow for obtaining an instances of a validated instrument, according to one or more embodiments.

FIG. 2 depicts an exemplary flow diagram illustrating a workflow for obtaining an instances of a validated instrument, according to one or more embodiments. The flow diagram described in FIG. 2 may be performed by the environment 100 of FIG. 1. In other examples, aspects of the flowchart described in FIG. 2 may be performed in external systems and received by the environment 100. Alternatively, the flow diagram described in flowchart 200 may be performed by any computer process system capable of receiving image inputs such as computer 600.

At step 202, a trial session for a user may be initiated. A trial session may refer to the process and systems for a particular user to complete an instrument associated with a particular clinical study. For example, a trial session for a user may be initiated once the user has completed a portion of a clinical study. The trial session may be initiated by a provider of the clinical study. The trial session may be initiated to help standardize a clinical endpoint to meet specific measures set forth to support changes in reported data. The trial session may for example be initiated by an eCOA manager 104 accessing an electronic network 106 in order to allow a user 102 to access an eCOA from the eCOA library 120. The trial server may be initiated within the processing devices 110 of FIG. 1. Initiating the trial session may include associating the user with a study, wherein the validated instrument is associated with the study. The user may access the trial server via an authorization system (e.g., authorization system 103), with the authorization system including (i) an identity provider web service configured to access a fast healthcare interoperability resource server (e.g., where the eCOAs may be located within the eCOA library 120), and (ii) a firewall.

At step 204, the system (e.g., environment 100 of FIG. 1) may determine, via the trial server (e.g., via the processing devices 110), a validated instrument to be accessed for the trial session. For example, the validated instrument may be an eCOA. The validated instrument may for example be determined by extracting what clinical study a user is involved in. For example, the validated instrument may be extracted from the studies module 116 or a stored schedule for a clinical study.

At step 206, a request for an instance of the validated instrument may be transmitted to an instrument library (e.g., the eCOA library 120) and via the trial session (e.g., the processing devices 110). The instance of the validated example, may be a reference or pointer to a previously validated instrument. The instance of the validated example may be a validated screenshot of the validated instrument, allowing for the user to insert answers into the validated screenshot.

At step 208, a data reference object that is operable as a data reference link to the validated instrument stored in the instrument library (e.g., the eCOA library 120) is received from the instrument library, such that the data reference object is operable to execute the validated instrument without generating a copy of the validated instrument.

At step 210 a Graphical User Interface (GUI) of the trial session may operate the data reference object, such that a user device (e.g., device 600 as described in more detail below) executes the validated instrument by reference. This may allow one or more users (e.g., user 102) to access the validated instrument through a GUI (e.g., by accessing the server systems 108 through electronic network 106) and to interact with and and respond to the instrument. The results may then be saved to one or more storage devices (e.g., storage devices 112).

Figure 3A:
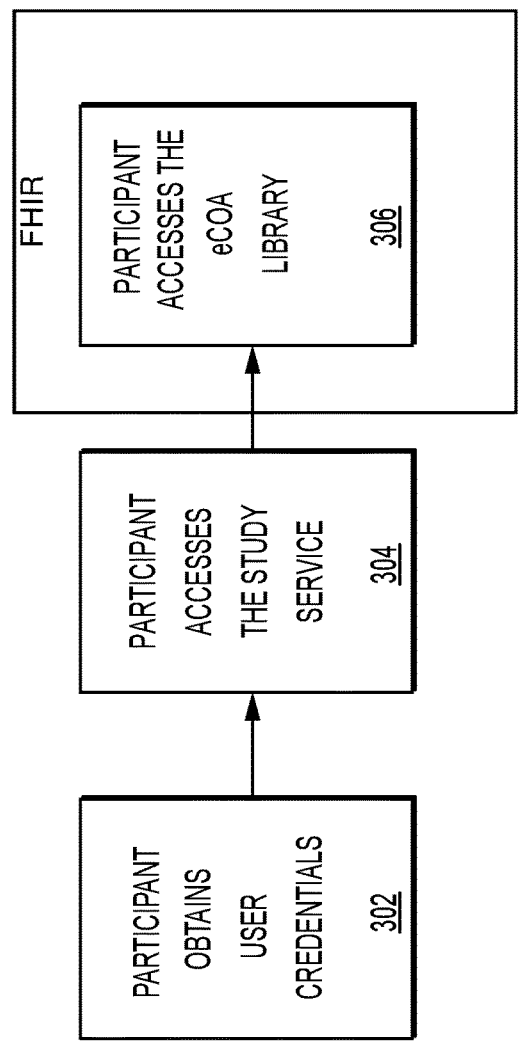
FIG. 3A depicts an exemplary flow diagram illustrating a workflow for obtaining access to a validated instrument, according to one or more embodiments.

FIG. 3A depicts an exemplary flow diagram illustrating a workflow for obtaining access to a validated instrument, according to one or more embodiments. The flow diagram described in FIG. 3A may be performed by the environment 100 of FIG. 1. In other examples, aspects of the flowchart described in FIG. 3A may be performed in external systems and received by the environment 100. Alternatively, the flow diagram described in flowchart 300 may be performed by any computer process system capable of receiving image inputs such as computer 600.

At step 302, a participant may obtain user credentials in order to provide initial access to a study. For example, a patient may be introduced to a clinical study. For example, a patient may be selected for a study that a particular organization operates. Upon being selected, a patient may be administered a particular care plan. The care plan may be patient specific or generated evenly for a study. The patient may for example go to organization site to be a participant in the clinical study. The organization cite may for example have a medical equipment to administer the collection of samples, reading, etc. In another example, the clinical study may be administered in a remote fashion across a large geographical area with a large sample size of patients. A first step may be to provide the participant with credentials to access the study. For example, a user may be assigned (e.g., associated) with multiple credentials (e.g., a password, code, etc.) where the credential may be associated with a particular user. The credential may be assigned at an organization cite or online (e.g., through network 106). The credentials may allow a user to access one or more portions or aspects of the system servers 108 of FIG. 1. For example, the credentials may allow for a user to access data submitted from a particular organization, data such as questionnaires from the eCOA library 120.

Figure 3B:
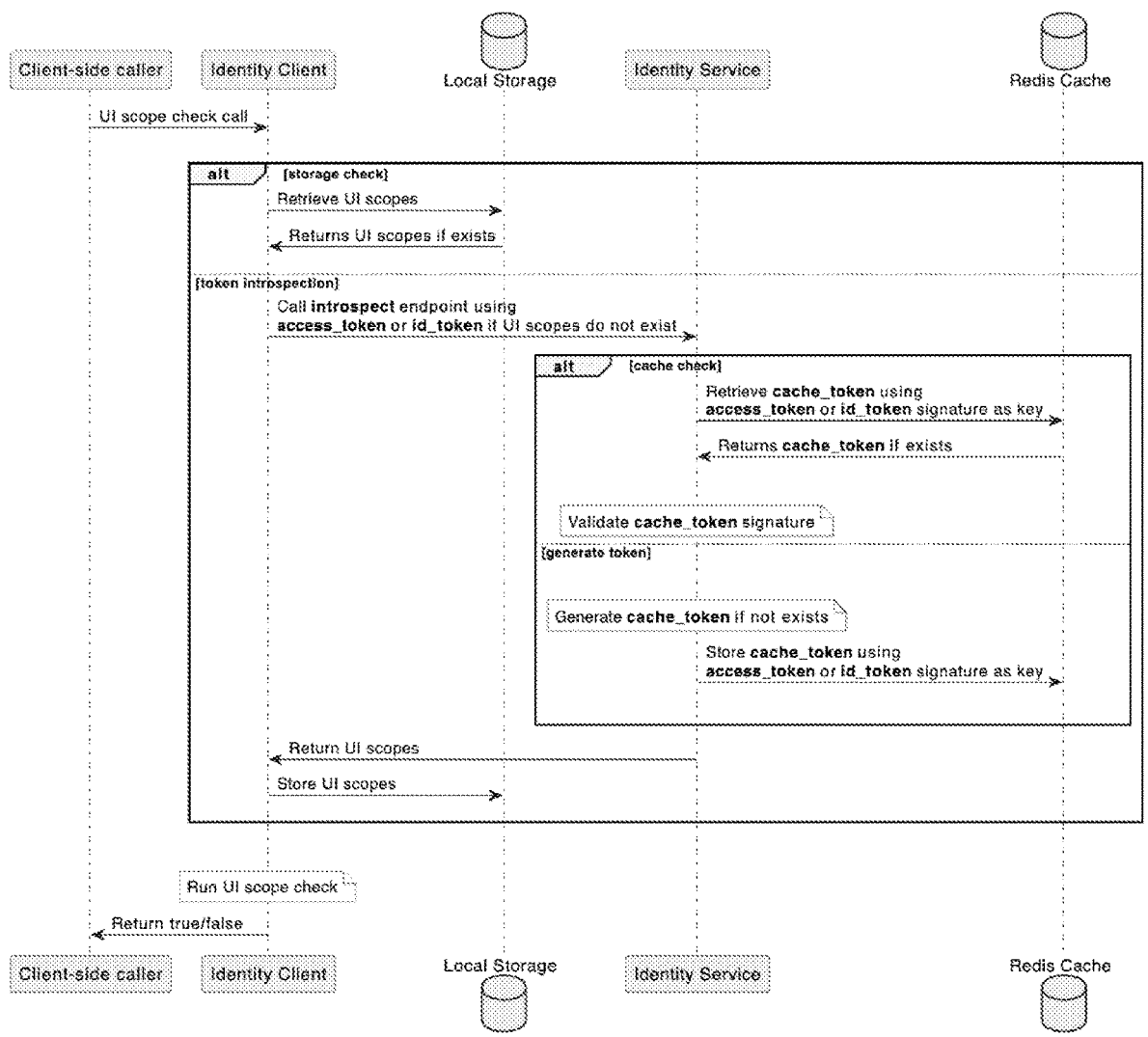
FIG. 3B depicts an exemplary communication flow diagram illustrating a workflow for obtaining access to a validated instrument, according to one or more embodiments.

At step 304, the participant may access the study service (e.g., a particular organization's study). The organization study may for example be administered by an organization sponsor, where the organization sponsor administer the clinical study through a secondary organization. While accessing the organization study, the patient may follow part of a previously developed plan for the clinical trial. The plan may for example have been created and may be administered by the server systems 108. FIG. 3B may provide an exemplary use of the front end authorization of accessing the study service.

At step 306, the participant may access the eCOA library (e.g., the eCOA library 120). For example, this access may occur upon completion of a portion of the clinical trial, whereby the research may include a clinical endpoint to meet specific measures set forth to support changes in reported data. For example, a patient (or alternatively, an administer of the clinical study on behalf of the patient) may request authorization of an instrument. For example, a user (e.g., the user 102) may utilize an authorization system (e.g., the authorization system 103) through a network to request access to the eCOA library. Upon receiving approval, a user may first complete a contract or fill out identifying information. Next, the user may obtain access to an eCOE (e.g., through the eCOA library 120). The eCOA library may for example be stored in an FHIR server The eCOA may for example be a data reference object that is operable as a data reference link to the validated eCOA in the eCOA library. Through a GUI, the user may fill out the questionnaire. The answers may then be saved to storage (e.g., storage devices 112) for further analysis (e.g., by the report and analytics module 122).

FIG. 3B depicts an exemplary communication flow diagram illustrating a workflow for obtaining access to a validated instrument, according to one or more embodiments. The flow diagram described in FIG. 3B may be performed by the environment 100 of FIG. 1. In other examples, aspects of the flowchart described in FIG. 3B may be performed in external systems and received by the environment 100. Alternatively, the flow diagram described in flowchart 350 may be performed by any computer process system capable of receiving image inputs such as computer 600. For example, flowchart 350 may depict an example of a participant accessing a study or eCOA library (corresponding to step 304 of FIG. 3B)

A user, e.g., a participant, administrator, or the like, either at a clinical site or remotely may utilize a computing device (e.g., computer 600) to obtain access to a particular study. The computing device may be represented as a "client-side caller" device. This device may identify whether the participant has access to a particular study service, e.g., by performing a US scope check call. Scope may refer to an identifier for resources that client wants to access. The scope check call may have access to a local device conducting a study. The local device may for example have access to server systems 108. The device may search local storage for an individual's credential. If found in local storage, access may be granted to a participant.

If credentials for the user do not exist in the local storage (e.g., if the UI scope does not exist at a local level), then, the device may query non-local resources, e.g., via a token introspection process. Token introspection may refer to a process of accessing information about access tokens from an external server (e.g., from the server system 108). For example, the participant's credentials may be inputted and compared to potentially stored credentials located on an external system (e.g., in a cache in one or more storage devices). If the credential's match a stored set of credentials, then a validated cache token may be returned, allowing for a user to access a particular study. In some instances, the store of credentials on the local storage may be updated accordingly. Alternatively, if a device identifies that a user is a participant of a study, but has not previously created a cache token for the participant, then a cache token for the particular participant may be created, e.g., manually or via any suitable process. The cache token may then give access of a participant to access a server (e.g., the eCOA library 120). Setting up credentials for the user may include, for example, setting up the user's scope of access. The external server, may then return a UI scope to the participant's device, and e.g., if the credential were valid, allow a user to access a study.

Figure 4:
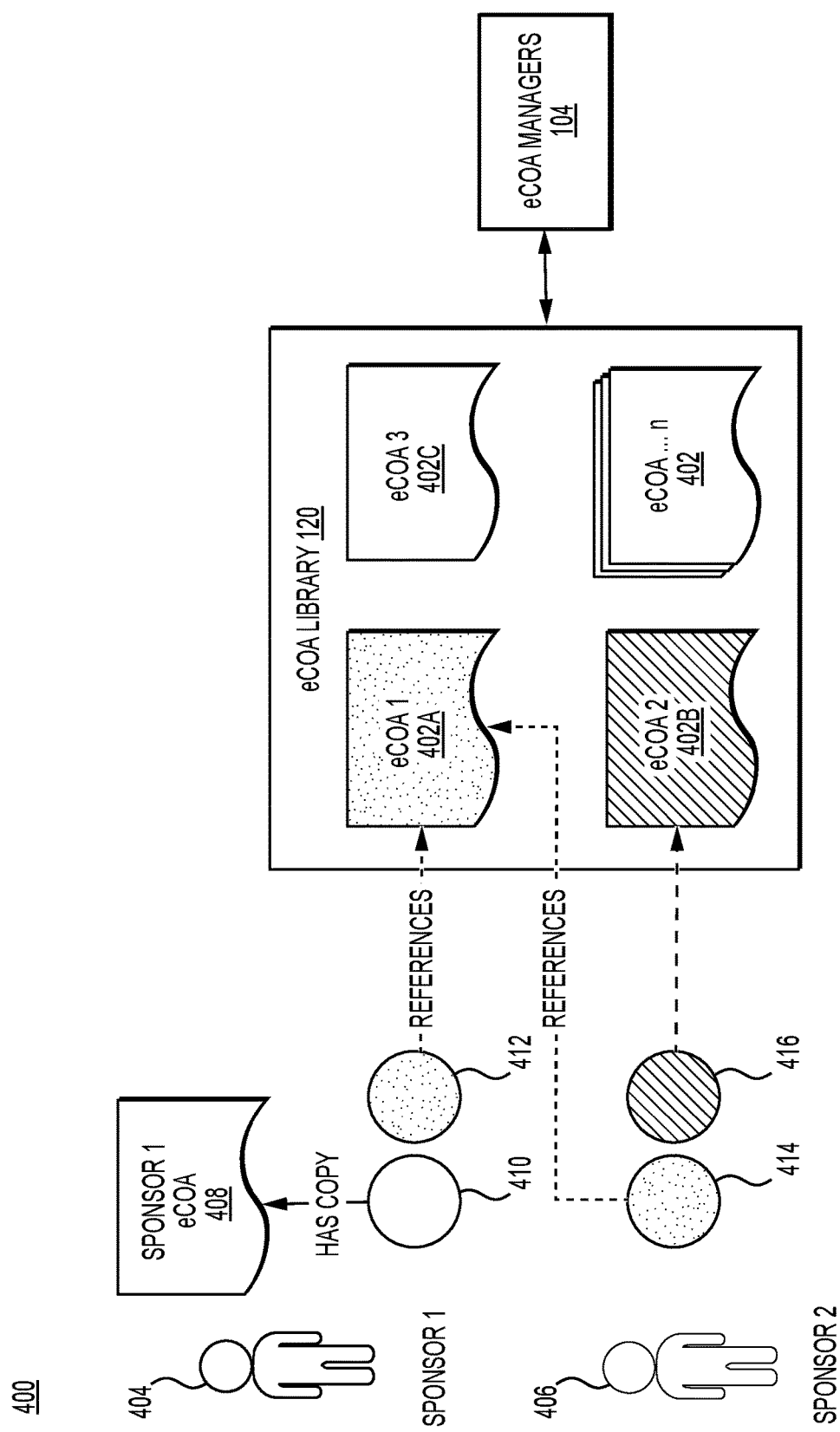
FIG. 4 depicts an exemplary environment for one or more sponsors accessing one or more validated instruments, according to one or more embodiments.

FIG. 4 depicts an exemplary environment 400 for one or more sponsors accessing one or more validated instruments, according to one or more embodiments. For example, a first sponsor 404 and a second sponsor 406 may access environment 400 to develop and administer one or more clinical studies. The environment 400 may for example access the environment 100 of FIG. 1.

Both the first sponsor 404 and second sponsor 406 may for example have access to the eCOA library 120. As discussed above, the eCOA library 120 may for example store a set of eCOAs 402. The set of eCOAs 402 may for example have been created and previously validated by one or more respective sponsor or by an eCOA manager 104. Once the sponsor or eCOA manager 104 has validated a particular eCOA, then this eCOA may for stored (e.g., in the eCOA library 120) and accessed by patients of respective studies.

In various examples, the first sponsor 404, the second sponsor 406, an administrator 410, and/or any other suitable individual or organization may create and/or validate an eCOA 408. This may then be uploaded to the eCOA library 120 for future use.

The eCOA library 120 may store a set of eCOA's 402. The set of eCOA's 402 may include a first eCOA 402a, a second eCOA 402b, a third eCOA 402c, etc. In one example, the first sponsor 404 may administer one or more clinical studies. The clinical studies may for example utilize the first eCOA 402a. As previously discussed, it may be necessary for a clinical study to utilize a validated version of an eCOA. In conventional systems, it may have been required that when a previously validated eCOA was copied for use in a new study, that the copy of the eCOA would need to be revalidated in order to be used i. In contrast, the eCOA library 120 may save validated eCOAs. Then studies conducted by respective sponsors, may access a data reference object that is operable as a data reference link to the validated eCOA stored in the eCOA library 120, such that the data reference object is operable to execute the validated eCOA, e.g., without generating a copy of the validated eCOA that would need to be revalidated.

For example, the first sponsor 404 may conduct a first study 412. The first study 412 may allow each patient of the study to access the first eCOA 402a by reference as discussed above. The answers to the first eCOA may be stored for further analysis and compilation within the respective first study.

In another example, the second sponsor 406 may conduct a second study 414 and a third study 416. The second study 414 may allow each patient of the study to access the first eCOA 402a by reference as discussed above. Advantageously, the first eCOA 402a does not need to be revalidated for this study, even though it was also utilized by the first study 412. The third study 416 may allow each patient of the study to access a second eCOA 402b by reference as discussed above. Organizations and sponsors (e.g., the first sponsor 404 and the second sponsor 406) may utilize the environment 400 and more specifically the eCOA library 120 to access the previously validated eCOAs.

An organization may conduct a first clinical study and a second clinical study. The environment 100 of FIG. 1 may be accessed by the organization to develop the studies (e.g., the first clinical study and the second clinical study). For example, an eCOA manager may utilize the additional tools 124 to develop a study and as associated timeline for the study. This may include accessing one or more tools to develop a schedule for one or more patients within the study.

The organization may for example, plan a schedule 1 and a schedule 2 for a first clinical study. The organization may further plan a schedule for the second clinical study. Each planed schedule may be an assigned schedule for a particular patient or participant within the designed study. Each study, and schedule for an individual, may include completing a validated instrument. For example, each patient may be required to complete an eCOA (e.g., a first eCOA) at the end of the respective study that the patient participates in.

For example, the organization may determine that a particular first eCOA may be valuable and/or applicable for more than one study. For example, the organization may determine that the first study and second study should include participants completing the same first eCOA.

Conventional systems that are utilized by organizations to conduct studies may require that a single eCOA (e.g., the first eCOA) be validated for each particular study and/or each time the eCOA is used in a schedule to ensure that each questionnaire is standardized. This may be time consuming to re-validate a previously validated eCOA.

The environment (e.g., environment 100 of FIG. 1) may incorporate the techniques described in the flow diagram 200 to allow for each patient of the respective studies (e.g., the first study and second study) to access the validated first eCOA by reference. Thus, if the first eCOA was first validated for the first study, then, upon performance of the second study, the first eCOA form does not require re-validation of the first eCOA form. This may save time and resources when completing the second study while maintaining the integrity of the validation for the first eCOA.

Figure 5:
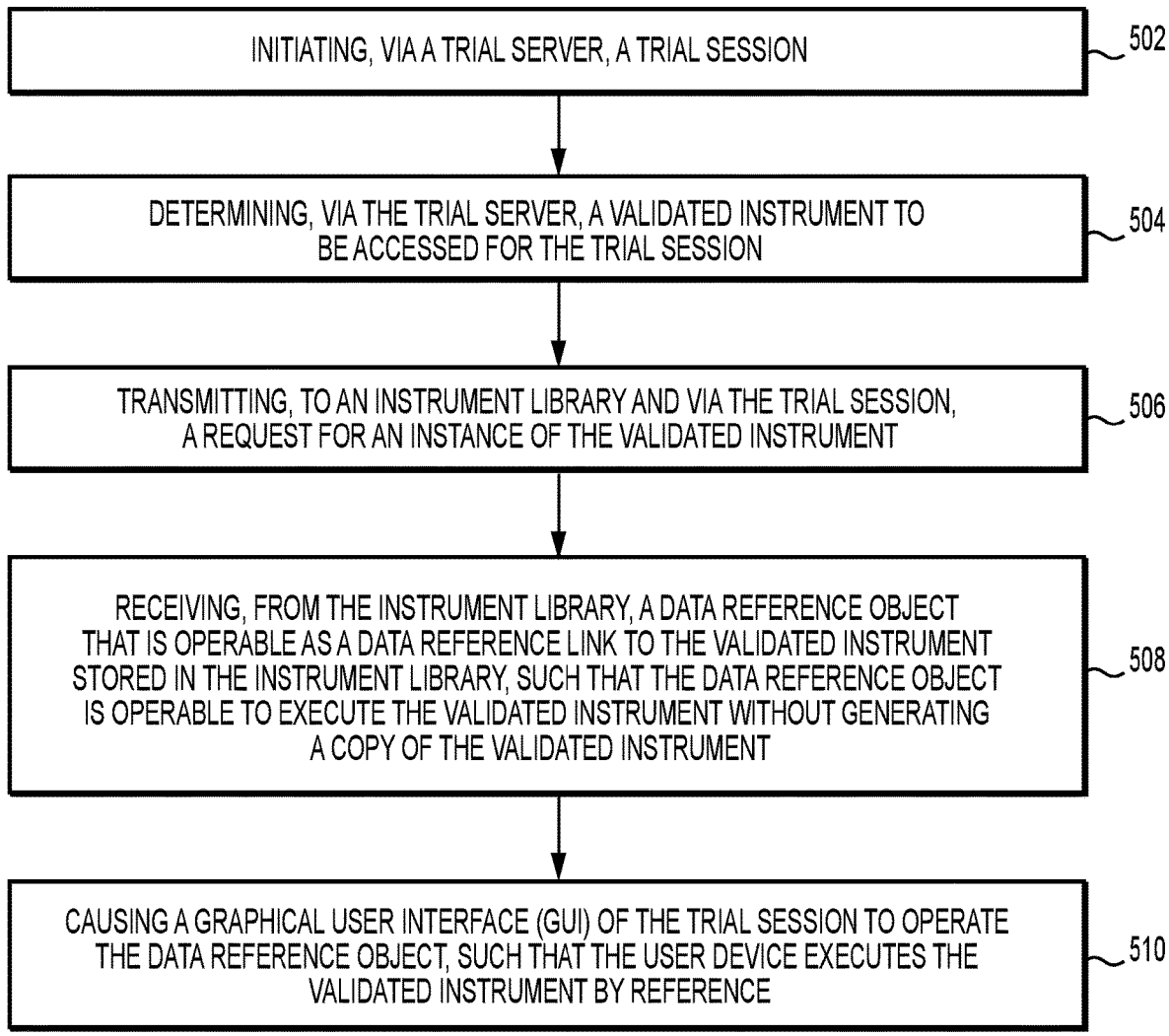
FIG. 5 depicts an exemplary method for using data reference links to maintain data validation, according to one or more embodiments.

FIG. 5 depicts an exemplary method for using data reference links to maintain data validation, according to one or more embodiments.

At step 502, a trial session may be initiated via a trial server.

At step 504, a validated instrument to be access for the trial session may be determined via the trial server.

At step 506, a request for an instance of the validated instrument may be transmitted to an instrument library and via the trial session.

At step 508, a data reference object that is operable as a data reference link to the validated instrument stored in the instrument library may be received from the instrument library, such that the data reference object is operable to execute the validated instrument without generating a copy of the validated instrument.

At step 510, a GUI of the trial session may be caused to operate the data reference object, such that the user device executes the validated instrument by reference.

Figure 6:
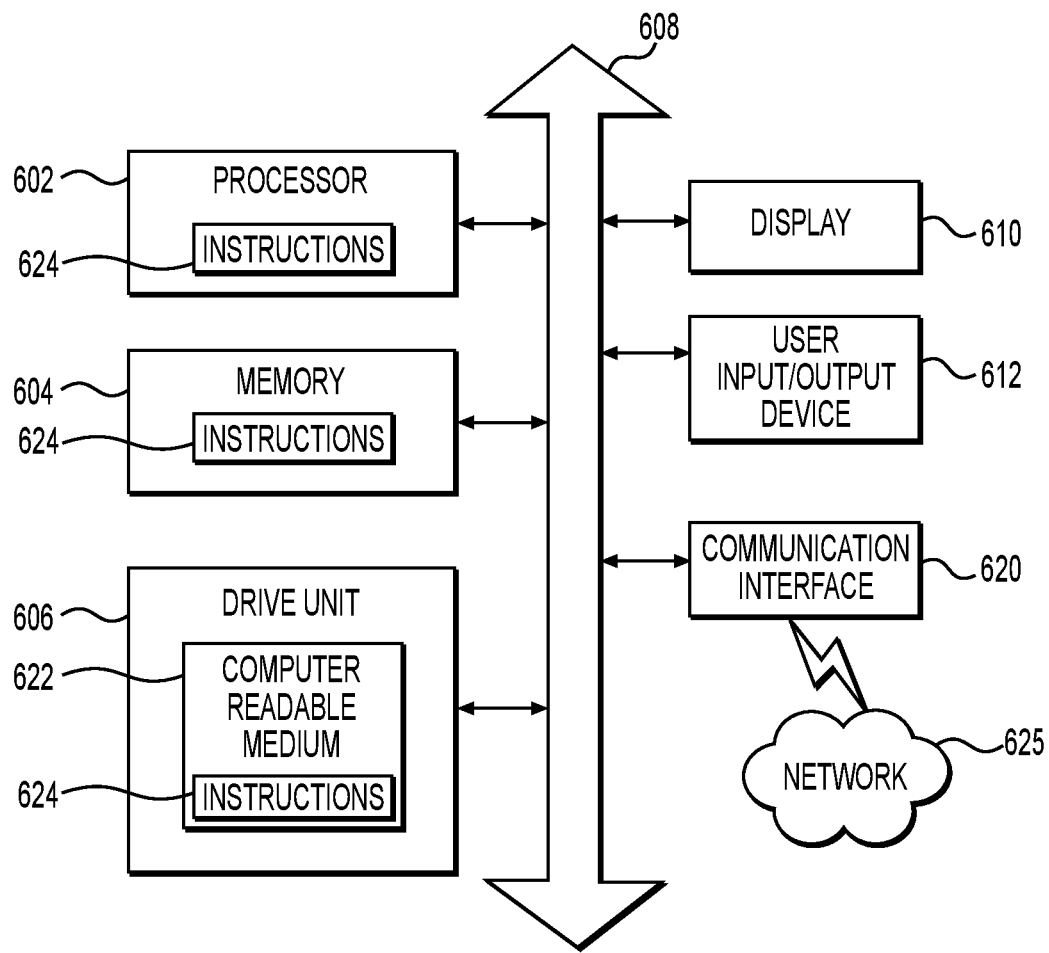
FIG. 6 depicts a simplified functional block diagram of a computer, according to one or more embodiments

FIG. 6 depicts a simplified functional block diagram of a computer, according to one or more embodiments. The computer 600 of FIG. 6 may be utilized by a user 102 or an eCOA manager 104 to access the server systems 108 of FIG. 1. Further the computer 600 may be utilize to execute the methods of FIG. 2, 3, 4, or 5, according to exemplary embodiments of the present disclosure. One or more of a processor 602, a memory 604, a drive unit 606, an internal communication bus 608, a display 610, a under input/output ports 612, a communication interface 620, a computer readable medium 622, instructions 624, and a network 625 may communicate by any suitable means. For example, computer 600 may be configured as the one or more sensors, patient communication device, and/or another system according to exemplary embodiments of this disclosure. In various embodiments, any of the systems herein may be a computer 600 including, for example, data communication interface 620 for packet data communication. Computer 600 also may include a central processing unit (CPU) 602, in the form of one or more processors, for executing program instructions. Computer 600 may include internal communication bus 608, and storage unit 606 (such as Read-Only Memory (ROM), Hard Disk Drive (HDD), Solid-State Drive (SSD), etc.) that may store data on computer readable medium 622, although computer 600 may receive programming and data via network communications. Computer 600 may also have memory 604 (such as Random-Access Memory (RAM)) storing instructions 624 for executing techniques presented herein, although instructions 624 may be stored temporarily or permanently within other modules of computer 600 (e.g., processor 602 and/or computer readable medium 622). Computer 600 also may include input and output ports 612 and/or display 610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, medical equipment, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments may be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for using data reference links to maintain data validation, comprising:
    storing, in a centralized electronic Clinical Outcome Assessment (eCOA) library, a set of validated instruments, each validated instrument being defined by a data structure that is validated for clinical use such that a respective validation is bound to the data structure and is untransferable to any copies or reproductions of the data structure;
    initiating, via a trial server, a trial session for a user;
    determining, via the trial server, a validated instrument of the set of validated instruments to be accessed from the eCOA library for the trial session;
    transmitting, to the eCOA library and via the trial session, a request for an instance of the validated instrument;
    receiving, from the eCOA library, a data reference object that is operable as a data reference link to the validated instrument stored in the eCOA library, such that the data reference object is operable to execute the validated instrument without generating a copy or reproduction of the validated instrument; and
    causing a Graphical User Interface (GUI) of the trial session to operate the data reference object, such that a user device executes the validated instrument by reference to the validated instrument centrally stored in the eCOA library without generating a copy or reproduction of the validated instrument and while maintaining the validation bound to the validated instrument stored in the eCOA library.

2. The method of claim 1, wherein the validated instrument is an electronic questionnaire.

3. The method of claim 1, wherein initiating the trial session includes associating the user with a study, wherein the validated instrument is associated with the study.

4. The method of claim 3, wherein the validated instrument is further associated with at least one further study, such that the data reference object is operable in parallel with operation of one or more other data reference objects linked to the validated instrument for the at least one further study.

5. The method of claim 1, wherein the eCOA library is configured to store the validated instrument in a fast healthcare interoperability resource server associated with the eCOA library.

6. The method of claim 5, further comprising:
accessing, the trial server via an authorization system, the authorization system including (i) an identity provider web service configured to access the fast healthcare interoperability resource server, and (ii) a firewall.

7. The method of claim 1, wherein the user device executing the validated instrument by reference accesses a validated screenshot of the validated instrument, allowing for the user to insert answers into the validated screenshot.

8. The method of claim 1, wherein the request to the eCOA library includes a request for at least one further validated instrument, such that at least one further data reference object corresponding to the at least one further validated instrument is received from the eCOA library, and such that the GUI is caused to operate the at least one further data reference object such that the user device executes the at least one further validated instrument by reference.

9. The method of claim 1, further comprising:
saving the executed validated instrument by reference to one or more storage devices.

10. The method of claim 1, further comprising:
compiling the executed validated instrument and associating at least one user response included with the executed validated instrument with a study.

11. A system, the system comprising:
a centralized electronic Clinical Outcome Assessment (eCOA) library storing a set of validated instrument, each validated instrument being defined by a data structure that is validated for clinical use such that a respective validation is bound to the data structure and is untransferable to any copies or reproductions of the data structure;
a user device associated with a user; and
a trial server, including:
at least one memory storing instructions; and
at least one processor configured to execute the instructions to perform operations for determining data integrity, the operations including:
causing the user device to initiate a trial session for the user;
determining a validated instrument of the set of validated instruments to be accessed from the eCOA library for the trial session;
transmitting, to the eCOA library and via the trial session, a request for an instance of the validated instrument;
receiving, from the eCOA library, a data reference object that is operable as a data reference link to the validated instrument stored in the eCOA library, such that the data reference object is operable to execute the validated instrument without generating a copy or reproduction of the validated instrument; and
causing a Graphical User Interface (GUI) of the trial session to operate the data reference object, such that a user device executes the validated instrument by reference to the validated instrument centrally stored in the eCOA library without generating a copy or reproduction of the validated instrument and while maintaining the validation bound to the validated instrument stored in the eCOA library.

12. The system of claim 11, wherein the validated instrument is an electronic questionnaire.

13. The system of claim 11, wherein initiating the trial session includes associating the user with a study, wherein the validated instrument is associated with the study.

14. The system of claim 13, wherein the validated instrument is further associated with at least one further study, such that the data reference object is operable in parallel with operation of one or more other data reference objects linked to the validated instrument for the at least one further study.

15. The system of claim 11, wherein the eCOA library is configured to store the validated instrument in a fast healthcare interoperability resource server associated with the eCOA library.

16. The system of claim 15, further comprising:
an authorization system including (i) an identity provider web service configured to access the fast healthcare interoperability resource server, and (ii) a firewall, wherein the authorization system is configured to control access to the trial server.

17. The system of claim 11, wherein the user device executing the validated instrument by reference via the trial session accesses a validated screenshot of the validated instrument, and is configured to enable the user to insert answers into the validated screenshot.

18. The system of claim 11, wherein the request to the eCOA library includes a request for at least one further validated instrument, such that at least one further data reference object corresponding to the at least one further validated instrument is received from the eCOA library, and such that the GUI is caused to operate the at least one further data reference object such that the user device executes the at least one further validated instrument by reference.

19. The system of claim 11, further comprising:
saving the executed validated instrument by reference to one or more storage devices.

20. A non-transitory computer readable medium storing processor-readable instructions which, when executed by at least one processor, cause the at least one processor to perform operations including:
storing, in a centralized electronic Clinical Outcome Assessment (eCOA) library, a set of validated instrument, each validated instrument being defined by a data structure that is validated for clinical use such that a respective validation is bound to the data structure and is untransferable to any copies or reproductions of the data structure;
initiating, via a trial server, a trial session for a user;
determining, via the trial server, a validated instrument form the set of validated instruments to be accessed from the eCOA library for the trial session;
transmitting, to the eCOA library and via the trial session, a request for an instance of the validated instrument;
receiving, from the eCOA library, a data reference object that is operable as a data reference link to the validated instrument stored in the eCOA library, such that the data reference object is operable to execute the validated instrument without generating a copy or reproduction of the validated instrument; and
causing a Graphical User Interface (GUI) of the trial session to operate the data reference object, such that a user device executes the validated instrument by reference to the validated instrument centrally stored in the eCOA library without generating a copy or reproduction of the validated instrument and while maintaining the validation bound to the validated instrument stored in the eCOA library.

* * * * *